(12) United States Patent
Hori

(10) Patent No.: US 7,071,580 B2
(45) Date of Patent: Jul. 4, 2006

(54) UNINTERRUPTIBLE POWER SUPPLY APPARATUS

(75) Inventor: Masanori Hori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 341 days.

(21) Appl. No.: 10/641,514

(22) Filed: Aug. 14, 2003

(65) Prior Publication Data

US 2004/0189094 A1   Sep. 30, 2004

(30) Foreign Application Priority Data

Feb. 21, 2003   (JP) .............................. 2003-044506

(51) Int. Cl.
*H02J 3/00* (2006.01)
(52) U.S. Cl. .............................. 307/23; 307/65; 307/66
(58) Field of Classification Search .................. 307/65, 307/66, 23
See application file for complete search history.

(56) References Cited

U.S. PATENT DOCUMENTS

| | | | | |
|---|---|---|---|---|
| 3,614,461 | A * | 10/1971 | Speer et al. .................. | 307/64 |
| 4,381,457 | A * | 4/1983 | Wiles .......................... | 307/64 |
| 4,763,013 | A | 8/1988 | Gvoth, Jr. et al. | |
| 5,229,651 | A | 7/1993 | Baxter, Jr. et al. | |
| 5,446,645 | A | 8/1995 | Shirahama et al. | |
| 5,670,833 | A | 9/1997 | Mengelt et al. | |
| 5,708,771 | A | 1/1998 | Brant et al. | |
| 6,041,414 | A | 3/2000 | Kikuchi | |
| 6,170,062 | B1 | 1/2001 | Henrie | |
| 6,201,371 | B1 | 3/2001 | Kawabe et al. | |
| 6,496,342 | B1 * | 12/2002 | Horvath et al. ............... | 361/65 |
| 6,691,248 | B1 | 2/2004 | Nishijima et al. | |
| 2002/0087899 | A1 | 7/2002 | Kano et al. | |
| 2003/0023888 | A1 | 1/2003 | Smith et al. | |
| 2003/0125886 | A1 | 7/2003 | Spitaels et al. | |
| 2003/0217300 | A1 | 11/2003 | Fukumori et al. | |
| 2004/0068670 | A1 | 4/2004 | Suzuki et al. | |
| 2004/0078655 | A1 | 4/2004 | Sung | |
| 2004/0078663 | A1 | 4/2004 | Inaba | |
| 2004/0177283 | A1 | 9/2004 | Madany et al. | |

FOREIGN PATENT DOCUMENTS

| | | |
|---|---|---|
| EP | 0419015 A2 | 3/1991 |
| JP | 08-079986 | 3/1996 |
| JP | 08-079986 A * | 3/1996 |
| JP | 11-103539 | 4/1999 |

OTHER PUBLICATIONS

English Translation of JP 08-79986A Mar. 1996 Nakamura, Yoichi.*

* cited by examiner

*Primary Examiner*—Brian Sircus
*Assistant Examiner*—Brett Squires
(74) *Attorney, Agent, or Firm*—Mattingly, Stanger, Malur & Brundidge PC

(57) ABSTRACT

An uninterruptible power supply apparatus is equipped with a power supply input section a 2 and a power supply input section b 3 that receive two systems of power supply, respectively; a power supply output section a 4 and a power supply output section b 5 that output the power supply inputted in the power supply input section a 2 and the power supply input section b 3, respectively; and a control section 7 that detects a power failure state of the power supply that is inputted in at least of the power supply input section a 2 and the power supply input section b 3, and outputs a backup power supply from at least one of the power supply output section a 4 and the power supply output section b 5 based on a detection result obtained by the control section 7.

5 Claims, 6 Drawing Sheets

UNINTERRUPTIBLE POWER SUPPLY APPARATUS

BACKGROUND OF THE INVENTION

1. Field of the Invention

The present invention relates to an uninterruptible power supply apparatus that is used as a measure against power-failure for computer equipments such as disk array apparatuses, and more particularly to a technology that is effective when applied to an uninterruptible power supply that is connected to a computer equipment having two systems of power supply line inputs.

2. Related Background Art

A conventional uninterruptible power supply (UPS) apparatus typically has a plurality of AC power supply outputs, but only one system of AC power supply input for the UPS.

A computer equipment such as a disk array apparatus typically has two systems of AC power supply line inputs in order to prevent a system halt due to a trouble occurring at one point, in other words, such a computer equipment can cope with a power failure or a power supply trouble in only one of the systems.

When a UPS is connected to a computer equipment such as a disk array apparatus having two systems of AC power supply line inputs, one of the following three methods is conventionally used to connect the UPS to the two systems of AC power supply line inputs of the computer equipment:

① The UPS is connected to only one of the two systems of AC power supply line inputs, and the other one of the AC power supply line inputs is not connected to the UPS, but directly connected to the AC power supply line.

② One AC power supply output of the UPS is connected to the two systems of AC power supply line inputs, and the AC power supply line redundancy function is not used.

③ An additional UPS is prepared (i.e., two UPSs are prepared), and the two systems of AC power supply line inputs are connected to the two UPSs, respectively.

In addition, as an uninterruptible power supply apparatus to be connected to an apparatus having two systems of AC power supply line inputs, an all-time inverter type static uninterruptible power supply apparatus is known. This uninterruptible power supply apparatus is equipped with constant-voltage constant-frequency power supply units for two systems, and one system storage battery for the constant-voltage constant-frequency power supply units for two systems.

However, when a UPS is connected to a computer equipment having two systems of AC power supply line inputs by the conventional methods ①, ② and ③ described above, the following problems arise, respectively:

① Because the UPS is connected to only one of the two systems of AC power supply line inputs, power failure that occurs in the two AC power supply lines would cause power failure in one of the two systems of AC power supply line inputs that is directly connected to one of the AC power supply lines. Also, a shutdown process may not be normally performed, when only one of the AC power supply lines that is connected to the UPS has a power failure, the battery of the UPS is used up and the output of the UPS is shut off, and then later the other AC power supply line has a power failure,.

Moreover, if there is a power supply link function between the UPS and the computer equipment connected to the UPS, a half of the power supply link function does not work.

② A part of the AC power supply line redundancy function cannot be used, and therefore the AC power supply line redundancy function would not provide a strong measure against troubles in the power supply system.

③ Two UPSs are required, such that the system becomes expensive.

Also, in the case of the all-time inverter type static uninterruptible power supply apparatus, since each of the constant-voltage constant-frequency power supply units is equipped with a rectifying and charging circuit and a power inverter circuit, the system becomes expensive like the case where two UPSs are prepared.

SUMMARY OF THE INVENTION

The present invention has been made to solve the problems described above, and relates to a UPS that is equipped with two independent sets of AC input system and AC output system such that the UPS can backup two systems of AC power supply lines, and backup two systems of outputs at the time of power failure of one or both of the AC power supply lines.

In accordance with one embodiment of the present invention, an uninterruptible power supply apparatus, which is connectable to an equipment having two systems of power supply inputs and is capable of supplying two systems of power supply to the equipment, includes a first power supply input section and a second power supply input section that are provided with the two systems of power supply, respectively; a first power supply output section and a second power supply output section that output the power supply inputted in the first power supply input section and the second power supply input section, respectively; and a control section that detects a power failure state of the power supply that is inputted in each of the first power supply input section and the second power supply input is section, and outputs a backup power supply from at least one of the first power supply output section and the second power supply output section based on a result of the detection.

In accordance with one embodiment of the present invention, an uninterruptible power supply apparatus, which is connectable to an equipment having two systems of power supply inputs and is capable of supplying two systems of power supply to the equipment, includes a first power supply input section and a second power supply input section that are provided with the two systems of power supply, respectively; a first power supply output section and a second power supply output section that output the power supply inputted in the first power supply input section and the second power supply input section, respectively; a charging section that charges a battery with at least one of the power supply among the power supply inputted in the first power supply input section and the second power supply input section; a backup power converter section that converts a power charged in the battery into a backup power supply to be supplied to the equipment; and a control section that detects a power failure state of the power supply that is inputted in each of the first power supply input section and the second power supply input section, and outputs the backup power supply obtained by the backup power converter section from at least one of the first power supply output section and the second power supply output section based on a result of the detection.

In one aspect of the present invention, the uninterruptible power supply apparatus may include a first excess current detection section that is provided between the first power supply input section and the first power supply output section, and shuts off the power supply to the first power supply output section upon detecting a current greater than a predetermined current value, and a second excess current detection section that is provided between the second power supply input section and the second power supply output section, and shuts off the power supply to the second power supply output section upon detecting a current greater than a predetermined current value.

In another aspect of the present invention, when the first excess current detection section or the second excess current detection section shuts off the power supply to the first power supply output section or to the second power supply output section, the control section does not allow the backup power supply to be outputted to the power supply output section that is shut off.

In another aspect of the present invention, when the control section detects a power failure state of the power supply that is inputted in each of the first power supply input section and the second power supply input section, the control section sends a shutdown request signal to the equipment, and upon receiving a shutdown completion signal, the control section stops the power supply to be outputted from the first power supply output section and the second power supply output section.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Preferred embodiments of the present invention are described below with reference to the accompanying drawings. In the following description of the preferred embodiments, components having substantially the same functions are assigned the same reference numbers, and their description is not repeated.

Figure 1:
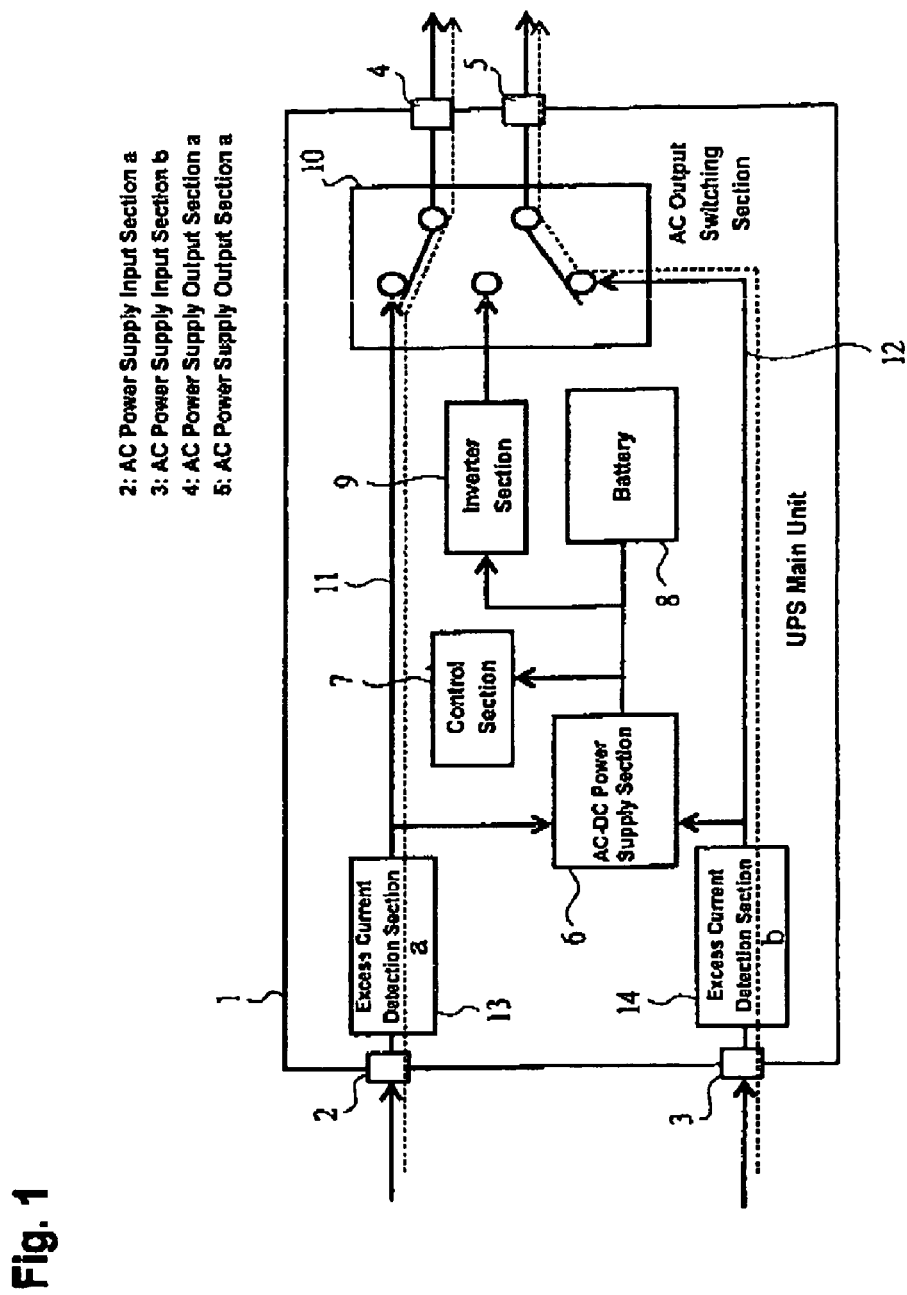
FIG. 1 schematically shows an example of a structure of an uninterruptible power supply apparatus in accordance with an embodiment of the present invention.

FIG. 1 schematically shows a structure of a uninterruptible power supply apparatus in accordance with an embodiment of the present invention. The uninterruptible power supply apparatus shown in FIG. 1 presents a normal state.

The uninterruptible power supply apparatus (hereafter referred to as the "UPS") shown in FIG. 1 has a main unit 1 that is basically composed of an AC power supply input section a 2, an AC power supply input section b 3, an AC power supply output section a 4, an AC power supply output section b 5, an AC-DC power supply section 6 that is a charging section, a control section 7, a battery 8, an inverter section 9 that is a backup power converter section, an AC output switching section 10, an AC bypass line a 11, an AC bypass line b 12, an excess current detection section a 13, and an excess current detection section b 14.

The AC power supply input section a 2 and the AC power supply input section b 3 are provided as inputs for two systems of AC power supply lines (for example, AC0 system and AC1 system), and are connected to the excess current detection section a 13 and the excess current detection section b 14, respectively.

The excess current detection section a 13 and the excess current detection section b 14 are connected to the AC bypass line a 11 and the AC bypass line b 12, respectively, and the AC bypass line a 11 and the AC bypass line b 12 are connected to the AC power supply output section a 4 and the AC power supply output section b 5 through the AC output switching section 10, respectively.

Also, the AC-DC power supply section 6 receives AC power supply from either a point in a rear stage of the excess current detection section a 13 and before the AC bypass line a 11 or a point in a rear stage of the excess current detection section b 14 and before the AC bypass line b 12, such that, when one of the AC power supply lines has a power failure, the AC-DC power supply section 6 can receive AC power supply from the other AC power supply line that is normal, and can feed DC power supply to the control section 7, the battery 8 and the inverter section 9.

AC power supply in two systems may always be provided to the AC-DC power supply section 6 if the AC-DC power supply section 6 is internally structured to receive inputs of power supply in two systems.

When the UPS main unit 1 in accordance with the present embodiment is an all-time commercial type, the inverter section 9 does not operate in a normal state. As indicated in FIG. 1, outputs of AC power supply in two systems from the AC power supply output section a 4 and the AC power supply output section b 5 are provided from the AC bypass line a 11 and the AC bypass line b 12 through the AC output switching section 10, respectively.

Accordingly, an output of DC power supply from the AC-CD power supply section 6 is normally used for operation of the control section 7 and charging the battery 8.

The control section 7 monitors a power feeding state of the AC bypass line a 11 and the AC bypass line b 12 based on, for example, a power feeding state of power supply to the AC-DC power supply section 6, and controls the inverter section 9 and the AC output switching section 10 based on the power feeding state of the AC bypass line a 11 and the AC bypass line b 12.

When the UPS main unit 1 is operating, the control section 7 controls the AC output switching section 10 to connect the AC bypass line a 11 and the AC power supply output section a 4 when the AC power supply input section a 2 is fed with power supply. Similarly, when the UPS main unit 1 is operating, the control section 7 controls the AC output switching section 10 to connect the AC bypass line b 12 and the AC power supply output section b 5 when the AC power supply input section b 3 is fed with power supply.

The inverter section 9 can feed AC power supply to one or both of the AC power supply output section a 4 and the AC power supply output section b 5 via the AC output switching section 10.

Next, referring to FIGS. 2 through 5, descriptions are made as to an example in which the UPS main unit 1 in accordance with the present invention is connected to a disk array apparatus, which is an example of a computer equipment, having two systems of AC power supply inputs, and a summary of operations of the UPS main unit 1.

Figure 2:
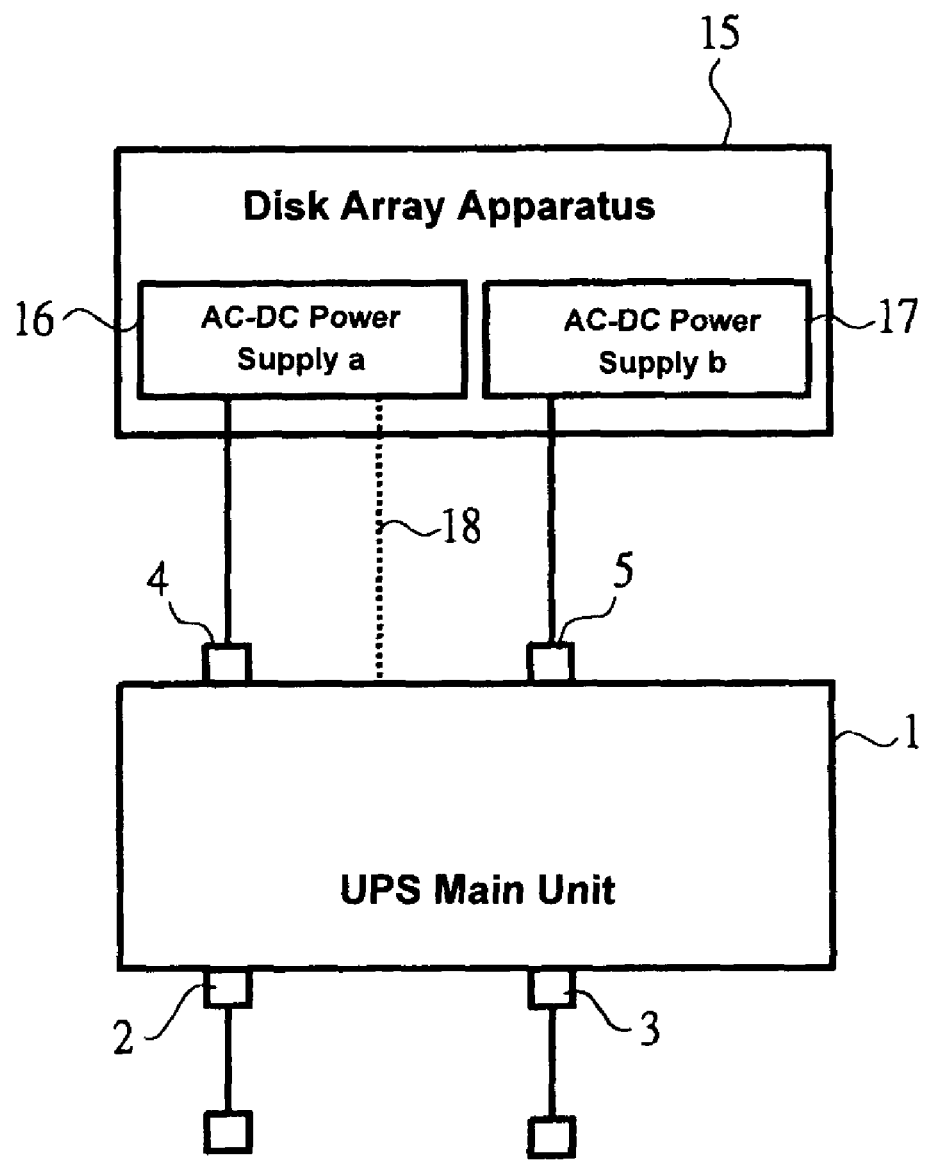
FIG. 2 schematically shows an example of a structure in which an uninterruptible power supply apparatus in accordance with an embodiment of the present invention is connected to a disk array apparatus.
Figure 3:
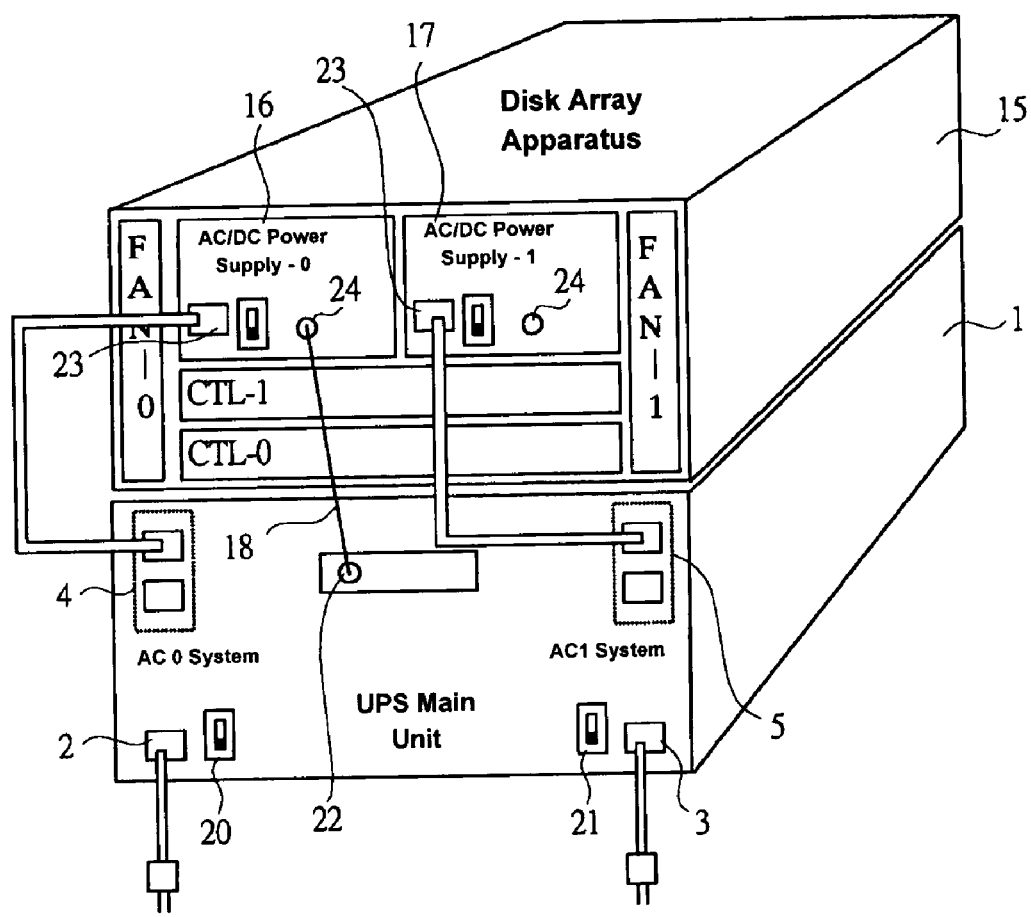
FIG. 3 is a diagram in support of describing an example of connection between an uninterruptible power supply apparatus in accordance with an embodiment of the present invention and a disk array apparatus.
Figure 4:
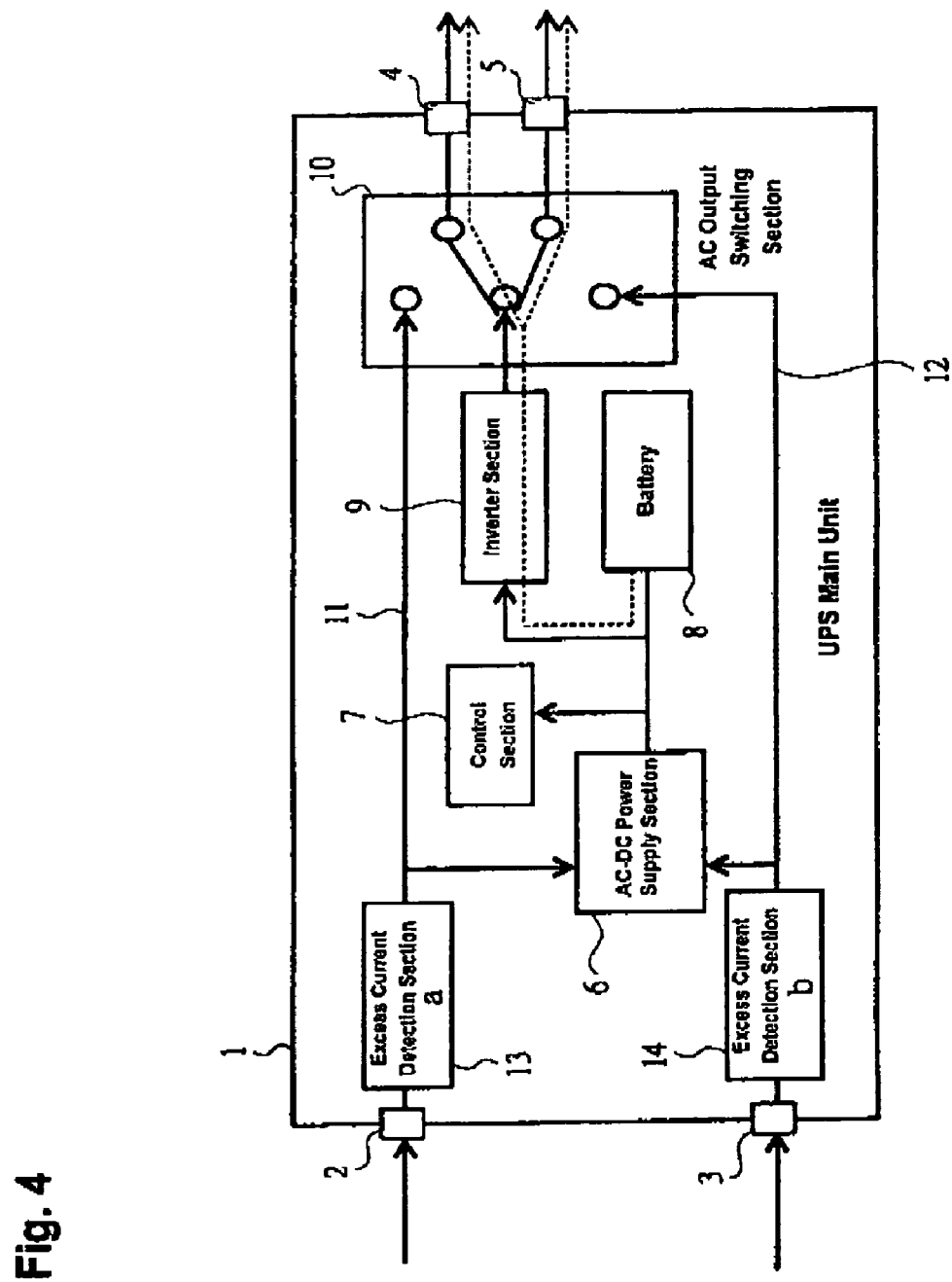
FIG. 4 is a diagram in support of describing an example of a state in which both of the two systems of AC power supply lines have power failure in an uninterruptible power supply apparatus in accordance with an embodiment of the present invention.
Figure 5:
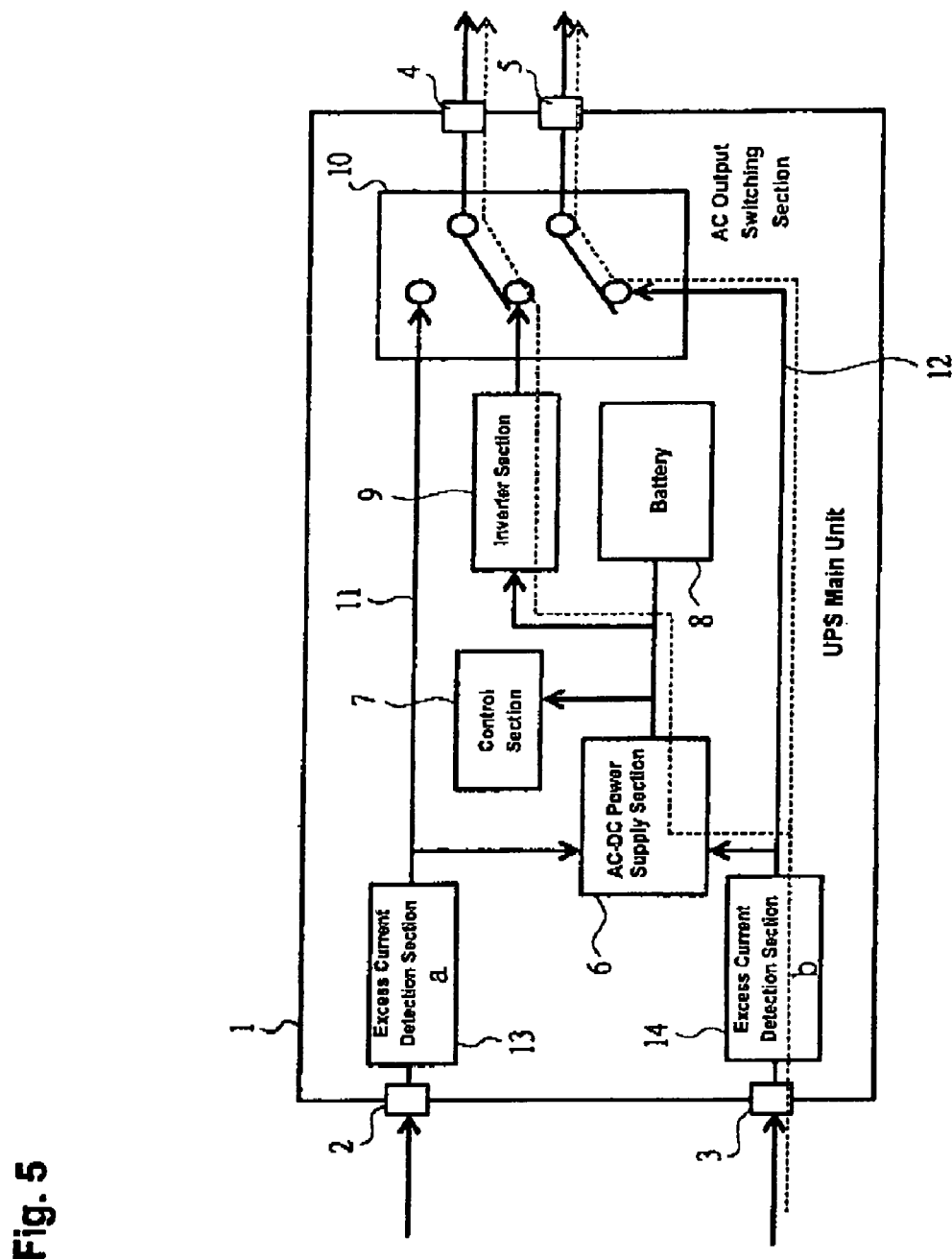
FIG. 5 is a diagram in support of describing an example of a state in which one of the two systems of AC power supply lines has power failure in an uninterruptible power supply apparatus in accordance with an embodiment of the present invention.

FIG. 2 schematically shows an example of a structure in which an uninterruptible power supply apparatus in accordance with an embodiment of the present invention is connected to a disk array apparatus. FIG. 3 is a diagram in support of describing an example of connection between the uninterruptible power supply apparatus in accordance with the embodiment of the present invention and a disk array apparatus. FIG. 4 is a diagram in support of describing an example of a state in which both of the two systems of AC power supply lines have power failure in the uninterruptible power supply apparatus in accordance with the embodiment of the present invention. FIG. 5 is a diagram in support of describing an example of a state in which one of the two systems of AC power supply lines has power failure in the uninterruptible power supply apparatus in accordance with the embodiment of the present invention.

As illustrated in FIGS. 2 and 3, the UPS main unit 1 is basically composed of an AC power supply input section a 2, an AC power supply input section b 3, an AC power supply output section a 4, an AC power supply output section b 5, a breaker switch 20 of a circuit breaker which is one example of an excess current detection section a 13, a breaker switch 21 of a circuit breaker which is one example of an excess current detection section b 14, and a communication terminal 22 for communication through a communication cable 18 with a disk array apparatus 15. The disk array apparatus 15 may be equipped with controllers (CTL-0, CTL-1) that control the disk array apparatus 15, and fans (FAN-0, FAN-1) for ventilating air through the entire disk array apparatus 15 including the controllers and hard disks to cool the disk array apparatus 15.

The communication terminal 22 is connected to a control section 7 inside the UPS main unit 1, and is used to send signals such as a shutdown request signal to the disk array apparatus 15, and receive signals such as a shutdown completion signal from the disk array apparatus 15.

The disk array apparatus 15 includes two systems of AC-CD power supplies, which are a AC-DC power supply a 16 and a AC-DC power supply b 17, for operating the disk array apparatus 15. Each of the AC-DC power supply a 16 and the AC-DC power supply b 17 is equipped with an AC power supply input section 23, and a communication terminal 24 for communicating with the UPS main unit 1, which may be used for a shutdown processing.

The communication terminal 24 of each of the AC-DC power supply a 16 and the AC-DC power supply b 17 can be switched to use one of two modes, i.e., a mode for performing a shutdown process by using both of the communication terminals 24 of the AC-DC power supply a 16 and the AC-DC power supply b 17 to communicate with the UPS main unit 1, and a mode for performing a shutdown process by using only one of the communication terminals 24 to communicate with the UPS main unit 1. In the present embodiment, a shutdown process is performed by using only one of the communication terminals 24.

When both the AC-DC power supply a 16 and the AC-DC power supply b 17 are provided with AC power supply, each of the AC-DC power supply a 16 and the AC-DC power supply b 17 operates with 50% of its full power. When one of the AC-DC power supply a 16 and the AC-DC power supply b 17 fails, the disk array apparatus 15 can be operated only with the other of the AC-DC power supplies.

When the AC power supply lines to both of the AC power supply input section a 2 and the AC power supply input section b 3 on the UPS main unit 1 have power failure, the control section 7 of the UPS main unit 1 detects the power failure state, and controls the AC output switching section 10 in a manner indicated in FIG. 4, for example, such that the AC power supply output section a 4 and the AC power supply output section b 5 are connected to an AC power supply output of the inverter section 9, and the inverter section 9 is operated to supply the AC power supply to the two AC-DC power supply a 16 and AC-DC power supply b 17 of the disk array apparatus 15. As a result, the disk array apparatus 15 can maintain its normal operation.

Also, the control section 7 of the UPS main unit 1 is capable of notifying through the communication cable 18 to the disk array apparatus of the occurrence of the abnormality on the AC power supply and sending a shutdown signal to the disk array apparatus 15.

Furthermore, the control section 7 of the UPS main unit 1 is capable of, upon receiving a shutdown completion signal indicating that the disk array apparatus 15 completed a shutdown process, stopping the output of the two AC power supply output sections.

As a result, when both of the two systems of AC power supply inputs to the UPS main unit 1 have power failure, the UPS main unit 1 can stop providing the AC power supply after the disk array apparatus 15 received a shutdown request signal from the UPS main unit 1, and the disk array apparatus 15 completed the shutdown process.

The function described above can be used not only in the event of occurrence of power supply abnormality such as power failures but also in the event of scheduled system shutdowns after completion of daily business operations or according to schedule operations. In this case, for example, the UPS main unit 1 may be equipped with a communication unit for communicating with a host apparatus. For example, upon receiving an instruction for a scheduled maintenance from the host apparatus through the communication unit, the disk array apparatus 15 can complete a shutdown process, and then the UPS main unit 1 can stop supplying the AC power.

Figure 6:
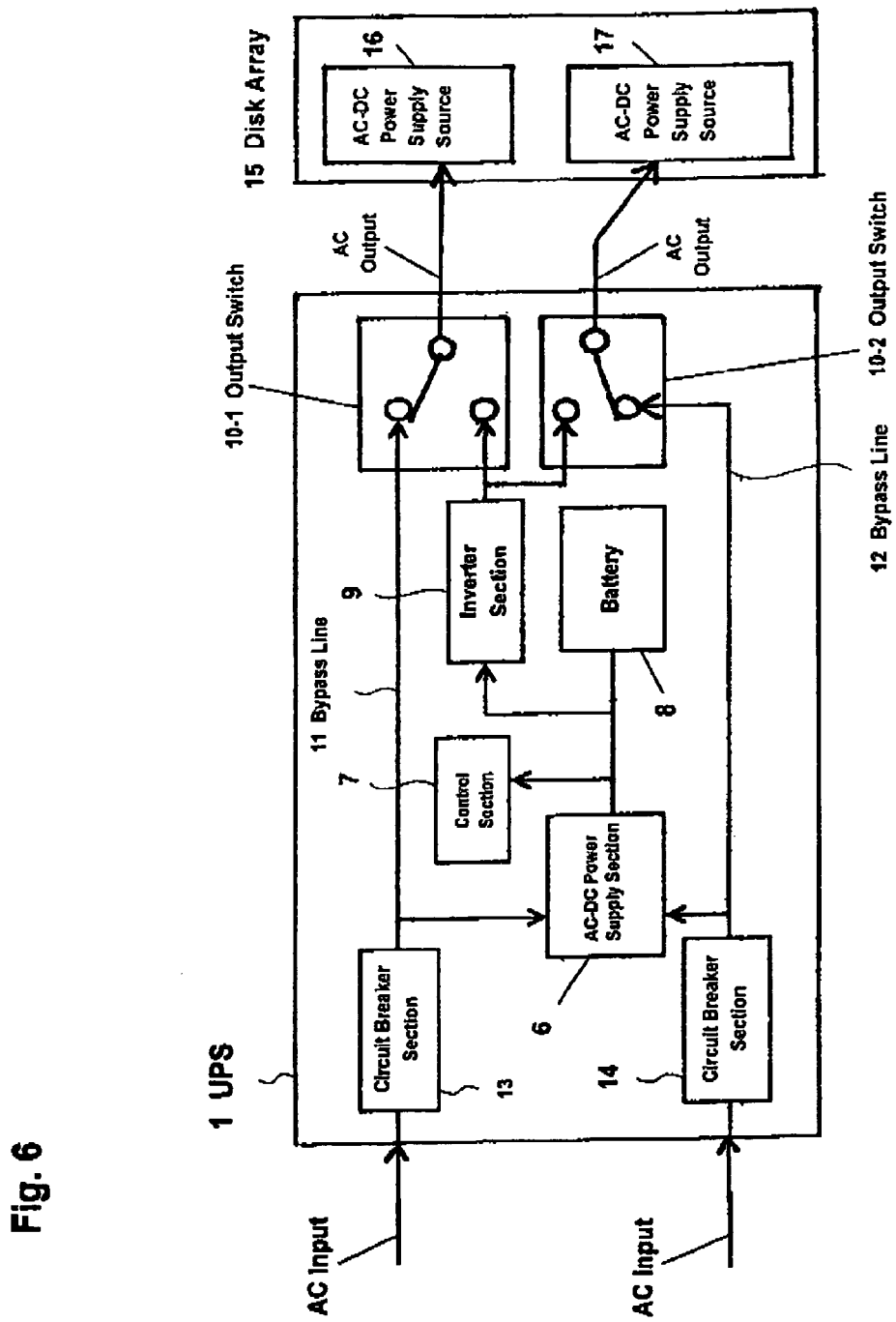
FIG. 6 schematically shows an example of a structure in which an uninterruptible power supply apparatus in accordance with an embodiment of the present invention is connected to a disk array apparatus.

In one embodiment as shown in FIG. 6, the output switching section 10 may be duplicated by providing two output switching sections 10-1 and 10-2. As a result, in the event of a failure of one of the output switching sections, the failed output switching section may be fixed or replaced while the other output switching section continuously supplies the power to the disk array.

Next, operations of the UPS main unit 1 in accordance with the present embodiment in the event of power failure are described in detail.

In accordance with the present embodiment, when both of the systems of AC power supply lines that are connected to the AC power supply input section a 2 and the AC power supply input section b 3 of the UPS main unit 1 simultaneously have power failure, one of two backup methods, i.e., a backup method in which only one of the systems is backed up and a backup method in which both of the systems are backed up, can be selected.

First, in the backup method in which only one of the systems is backed up, when the control section 7 of the UPS main unit 1 detects power failure on both of the systems, the control section 7 operates the inverter section 9 with the power of the battery 8, and controls the AC output switching section 10 such that, for example, only the AC power supply output section b 5 is connected to the inverter section 9, and the output of the AC power supply output section a 4 is stopped, to thereby output AC power supply only from the AC power supply output section b 5.

Accordingly, the disk array apparatus 15 that is connected to the UPS main unit 1 maintains its operation with only the AC-DC power supply b 17.

In the backup method in which both of the systems are backed up, when the control section 7 of the UPS main unit 1 detects power failure on both of the systems, the control section 7 operates the inverter section 9 with the power of the battery 8, and controls the AC output switching section 10 such that, for example, as shown in FIG. 4, both of the AC power supply output section a 4 and the AC power supply output section b 5 are connected to the inverter section 9 to thereby output AC power supply from both of the AC power supply output section a 4 and the AC power supply output section b 5.

As a result, the disk array apparatus 15 that is connected to the UPS main unit 1 maintains its operation with the AC-DC power supply a 16 and the AC-DC power supply b 17.

When both of the systems of AC power supply lines simultaneously have power failure, in either of the backup method in which only one of the systems is backed up and the backup method in which both of the systems are backed up, the UPS main unit 1 can send a shutdown request signal to the disk array apparatus 15 through the communication cable 18. When the disk array apparatus 15 has completed a shutdown process, the disk array apparatus 15 sends a shutdown completion signal through the communication cable 18 to the UPS main unit 1. Upon receiving the shutdown completion signal from the disk array apparatus 15, the UPS main unit 1 stops the supply of AC power to the disk array apparatus 15.

When only one of the systems of AC power supply lines that are connected to the AC power supply input section a 2 and the AC power supply input section b 3 of the UPS main unit 1 of the present embodiment has power failure, the UPS main unit 1 can select one of two operation modes, i.e., an operation mode in which the output of AC power supply on the power failure side is stopped, and the AC power is supplied only on the side that does not have power failure, or an operation mode in which the inverter section 9 is operated with the power supply on the side that does not have power failure to output the AC power supply from the inverter section 9, and the supply of the AC power on the side that has power failure is maintained.

In either of the operation modes described above, the power of the battery 8 is not used. This is to secure a backup duration when the other one of the AC power supply lines may have power failure later.

When the UPS main unit 1 is operated in a mode in which the output of AC power supply on the power failure side is stopped, and the AC power supply is provided only on the side that does not have power failure, for example, even when only the AC power supply input section a 2 has power failure, the inverter operation by the inverter section 9 is not conducted so as to stop the output of the AC power supply output section a 4, and only the AC power supply from the AC power supply output section b 5 is outputted to the disk array apparatus 15 which is an operation load.

Accordingly, the disk array apparatus 15 that is connected to the UPS main unit 1 maintains its operation only with the AC-DC power supply b 17.

If, in the state described above, the AC power supply input section b 3 further has power failure, the UPS main unit 1 does not output the AC power supply to the AC power supply output section a 4 whose output has already been stopped, and outputs the AC power supply from the AC power supply output section b 5 using an inverter output of the inverter section 9.

Accordingly, the disk array apparatus 15 that is connected to the UPS main unit 1 maintains its operation only with the AC-DC power supply b 17.

When the UPS main unit 1 is operated in a mode in which the inverter section 9 is operated with the power supply on the side that does not have power failure to output the AC power supply from the inverter section 9, and the supply of the AC power on the side that has power failure is maintained, for example, when only the AC power supply input section a 2 has power failure, the inverter section 9 is operated, and the AC output switching section 10 connects the inverter section 9 and the AC power supply output section a 4 to maintain the output of the AC power supply output section a 5, as shown in FIG. 5.

Accordingly, the disk array apparatus 15 that is connected to the UPS main unit 1 maintains its operation with the AC-DC power supply a 16 and the AC-DC power supply b 17.

In this case, the power of the battery 8 is not used, and the inverter section 9 operates with the DC power supply of the AC-DC power supply section 6 that is provided with the power supply from the AC power supply input section b 3 that does not have power failure.

At a later time, if the AC power supply input section b 3 also has power failure, the DC power supply that is fed to the inverter section 9 is switched to the power from the battery 8, such that the output from the AC power supply output section a 5 is maintained.

Then, the disk array apparatus 15 that is connected to the UPS main unit 1 maintains its operation only with the AC-DC power supply a 16.

Also, when only one of the systems of AC power supply lines has power failure, the UPS main unit 1 does not send a shutdown request signal through the communication cable 18. At a later time, if the other system of AC power supply line has power failure, the UPS main unit 1 sends a shutdown request signal through the communication cable 18 to the disk array apparatus 15. When the disk array apparatus 15 has completed a shutdown process, the disk array apparatus 15 sends a shutdown completion signal through the communication cable 18 to the UPS main unit 1. Upon receiving the shutdown completion signal from the disk array apparatus 15, the UPS main unit 1 stops the supply of AC power to the disk array apparatus 15.

Next, descriptions are made as to operations of the UPS main unit 1 in accordance with an embodiment of the present invention when the AC-DC power supply a 16 or the AC-DC power supply b 17 of the disk array apparatus 15 fails due to a short circuit mode.

In the present embodiment, the excess current detection section a 13 and the excess current detection section b 14 are connected to the AC power supply input section a 2 and the AC power supply input section b 3, respectively. Each of the excess current detection section a 13 and the excess current detection section b 14 may be composed of a circuit breaker, for example. When, for example, the AC-DC power supply a 16 of the disk array apparatus 15 fails due to a short-circuit mode, the circuit breaker composing the excess current detection section a 13 that serves as a path of excess current turns off, such that the current path on the AC-DC power supply b 17 is secured and the disk array apparatus 15 does not have a system halt.

In the UPS main unit 1 of the present embodiment, when the excess current detection section a 13 or the excess current detection section b 14 composing a circuit breaker turns off as a result of detection of an excess current, the AC power supply by the inverter section 9 is not outputted to the AC power supply output section on the side that has the circuit breaker turned off.

In the embodiment described above, as an example of operation of the UPS main unit 1 which takes place when only one of the systems of AC power supply lines that are connected to the AC power supply input section a 2 and the AC power supply input section b 3 has power failure, the UPS main unit 1 is operated in a manner that the inverter section 9 is operated with the AC power supply on the side that does not have power failure to output the AC power supply from the inverter section 9, thereby maintaining the supply of the AC power supply on the side that has power failure. However, the AC output switching section 10 or another AC output switching section may be used such that the AC power supply may be provided to the side that has power failure from the AC bypass line that does not have power failure, not from the inverter section 9.

Also, in one embodiment, when one or both of the systems of AC power supply lines that are connected to the AC power supply input section a 2 and the AC power supply input section b 3 have power failure, and when the AC-DC power supply a 16 or the AC-DC power supply b 17 of the disk array apparatus 15 fails due to a short-circuit mode, other measures may be taken to stop AC power supply to the AC power supply output section on the side that fails due to a short-circuit mode. For example, an excess current detection section may be provided in a preceding stage of each of the AC power supply output section a 4 and the AC power supply output section b 5, respectively. Based on a detection result of the excess current detection section, the supply of the AC power to the AC power supply output section on the side that fails due to a short-circuit mode may be stopped.

Also, even when one of the systems of AC power supply lines has power failure, and the AC-DC power supply of the disk array apparatus 15 that is connected to the AC power supply output section on the side that does not have power failure has a trouble due to a short-circuit mode, the supply of AC power supply to the AC-DC power supply having the trouble due to a short-circuit mode may be stopped, and the AC output switching section 10 or another AC output switching section may be used to switch the AC power supply to the AC-DC power supply that does not have the trouble.

Further, in the present embodiment, each of the excess current detection circuit a 13 and the excess current detection circuit b 14 is composed of a circuit breaker; and by turning off the circuit breaker, the AC power supply to the AC-DC power supply that has failed due to a short circuit mode is stopped. However, a current value detected by each of the excess current detection circuit a 13 and the excess current detection circuit b 14 may be monitored by the control section 7; based on the current value being monitored, the AC output switching section 10 may be controlled, such that the AC power supply to the AC-DC power supply that has failed due to a short-circuit mode may be stopped.

Also, in the present embodiment, the description is made as to an example in which the UPS main unit 1 is connected to the disk array apparatus 15 that is an example of a computer equipment. However, the present invention is applicable not only to the embodiment described above, but also to any equipment that has two systems of power supply inputs.

Furthermore, in the present embodiment, the description is made as to an example in which the UPS main unit outputs AC power supply. However, the present invention is also applicable to an uninterruptible power supply that outputs DC power supply.

In accordance with the present embodiment, an uninterruptible power supply apparatus, which is connectable to an equipment having two systems of power supply inputs and is capable of supplying two systems of power supply to the equipment, includes a first power supply input section and a second power supply input section that are provided with the two systems of power supply, respectively; a first power supply output section and a second power supply output section that output the power supply inputted in the first power supply input section and the second power supply input section, respectively; and a control section that detects a power failure state of the power supply that is inputted in each of the first power supply input section and the second power supply input section, and outputs a backup power supply from at least one of the first power supply output section and the second power supply output section based on a result of the detection. As a result, operations of the equipment that is operated with the two systems of power supply can be readily maintained against power supply troubles in power failures.

Also, when the control section detects a power failure state of the power supply that is inputted in each of the first power supply input section and the second power supply input section, the control section sends a shutdown request signal to the equipment, and upon receiving a shutdown completion signal from the equipment, the control section stops the power supply to be outputted from the first power supply output section and the second power supply output section. As a result, the equipment that operates with two systems of power supply can securely perform a shutdown process.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An uninterruptible power supply apparatus comprising:
   a first power supply input section and a second power supply input section that are adapted to receive power from two systems of power supply, respectively;
   a first power supply output section and a second power supply output section;
   an output switching section electrically connected to receive power from the first and second power supply input sections and to deliver the power to the first and second power supply output sections;

a control section that monitors a state of power supply to both of said first and second power supply input sections and, upon detectinq a power failure state of the power that is inputted in either of the first and second power supply input sections, controls the output switching section such that power from a backup power supply is outputted from at least one of the first power supply output section and the second power supply output section in response to the detection of input power failure by the control section;

a battery coupled to the first power supply input section and the second power supply input section;

a charging section electrically connected to both the first and second power supply input sections, that charges the battery with the power inputted from either of the first power supply input section and the second power supply input section; and an inverter section that is electrically connected between the battery and the output switching section, and that converts power charged in the battery into the backup power supply, wherein, when the control section detects a power failure state of the power supply that is inputted in the first power supply input section, the control section controls the output switching section to shut off the first power supply output section and directly connect the second power supply input section to the second power supply output section.

2. An uninterruptible power supply apparatus according to claim 1, wherein the inverter is not operated.

3. An uninterruptible power supply apparatus according to claim 2, wherein, when the control section detects a power failure state of the power supply that is inputted in the second power supply input section, the control section controls the output switching section to disconnect the second power supply input section from the second power supply output section and connect the inverter to the second power supply output section.

4. An uninterruptible power supply apparatus comprising:

a first power supply input section and a second power supply input section that are adapted to receive power from two systems of power supply, respectively;

a first power supply output section and a second power supply output section;

an output switching section electrically connected to receive power from the first and second power supply input sections and to deliver the power to the first and second power supply output sections;

a control section that monitors a state of power supply to both of said first and second power supply input sections and, upon detecting a power failure state of the power that is inputted in either of the first and second power supply input sections, controls the output switching section such that power from a backup power supply is outputted from at least one of the first power supply output section and the second power supply output section in response to the detection of input power failure by the control section;

a battery coupled to the first power supply input section and the second power supply input section;

a charging section electrically connected to both the first and second power supply input sections, that charges the battery with the power inputted from either of the first power supply input section and the second power supply input section; and an inverter section that is electrically connected between the battery and the output switching section, and that converts power charged in the battery into the backup power supply, wherein, when the control section detects a power failure state of the power supply that is inputted in the first power supply input section, the control section controls the output switching section to shut of f the first power supply output section and operate the inverter with the power supply inputted in the second power supply input section such that the power supply is outputted through the second power supply output section.

5. An uninterruptible power supply apparatus according to claim 4, wherein the battery is not used to provide power to either of the first power supply output section and the second power supply output section.

* * * * *